United States Patent
Ishino

(10) Patent No.: US 11,124,178 B2
(45) Date of Patent: Sep. 21, 2021

(54) AUTOMATIC TILTING VEHICLE

(71) Applicant: TOYOTA JIDOSHA KABUSHIKI KAISHA, Toyota (JP)

(72) Inventor: Takahito Ishino, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 200 days.

(21) Appl. No.: 16/390,723

(22) Filed: Apr. 22, 2019

(65) Prior Publication Data

US 2019/0322271 A1 Oct. 24, 2019

(30) Foreign Application Priority Data

Apr. 23, 2018 (JP) .............................. JP2018-082359

(51) Int. Cl.
*B60W 30/04* (2006.01)
*B62D 61/06* (2006.01)
(Continued)

(52) U.S. Cl.
CPC .............. *B60W 30/04* (2013.01); *B60T 8/17* (2013.01); *B60T 8/241* (2013.01); *B60W 10/04* (2013.01);
(Continued)

(58) Field of Classification Search
CPC .... B60W 30/04; B60W 10/04; B60W 10/184; B60W 10/20; B60W 2520/18;
(Continued)

(56) References Cited

U.S. PATENT DOCUMENTS

2010/0007204 A1* 1/2010 Nordhoff ................ B60T 8/62
                                                  303/190
2013/0041545 A1* 2/2013 Bär et al. ............ B60W 30/045
                                                  701/23

(Continued)

FOREIGN PATENT DOCUMENTS

| CN | 103038126 A | 4/2013 |
| CN | 104723822 A | 6/2015 |
| WO | 2012/049724 A1 | 4/2012 |

OTHER PUBLICATIONS

Noriaki Hirose et al., "Proposal of motion model around roll axis and posture stabilization control for personal mobility with leaning mechanism," The Japan Society of Mechanical Engineers, 2015, pp. 1-12, vol. 81, No. 826 English abstract.

(Continued)

*Primary Examiner* — Thomas G Black
*Assistant Examiner* — Brittany Renee Peko
(74) *Attorney, Agent, or Firm* — Sughrue Mion, PLLC

(57) ABSTRACT

An automatic tilting vehicle includes a pair of wheels that are non-steering driving wheels, a braking/driving device, a vehicle tilting device, and a control device, and the control unit calculates a target tilt angle of the vehicle for tilting the vehicle turning inward and controls the vehicle tilting device so that a tilt angle of the vehicle becomes the target tilt angle. The control unit calculates target braking/driving forces of the pair of wheels based on a braking/driving operation of a driver, corrects the target braking/driving forces so that a difference between vertical forces acting on the wheels caused by the braking/driving forces of the pair of wheels is reduced, and controls the braking/driving device such that braking/driving forces of the pair of wheels becomes the corrected target braking/driving forces.

4 Claims, 10 Drawing Sheets

(51) Int. Cl.
  *B62D 6/08*     (2006.01)
  *B62D 11/00*    (2006.01)
  *B60T 8/24*     (2006.01)
  *B62D 9/02*     (2006.01)
  *B60W 10/04*    (2006.01)
  *B60W 10/184*   (2012.01)
  *B60W 10/20*    (2006.01)
  *B60T 8/17*     (2006.01)
  *B62D 9/00*     (2006.01)

(52) U.S. Cl.
  CPC .......... *B60W 10/184* (2013.01); *B60W 10/20* (2013.01); *B62D 6/08* (2013.01); *B62D 9/002* (2013.01); *B62D 9/02* (2013.01); *B62D 11/003* (2013.01); *B62D 61/065* (2013.01); *B60T 2250/00* (2013.01); *B60T 2260/02* (2013.01); *B60T 2260/09* (2013.01); *B60W 2520/18* (2013.01); *B60W 2540/18* (2013.01); *B60W 2710/207* (2013.01); *B60W 2720/18* (2013.01)

(58) Field of Classification Search
  CPC ....... B60W 2540/18; B60W 2710/207; B60W 2720/18; B60T 8/17; B60T 8/241; B60T 2250/00; B60T 2260/02; B60T 2260/09; B62D 6/08; B62D 9/002; B62D 9/02; B62D 11/003; B62D 61/065
  See application file for complete search history.

(56) References Cited

U.S. PATENT DOCUMENTS

| | | |
|---|---|---|
| 2013/0193656 A1 | 8/2013 | Itoh et al. |
| 2015/0165856 A1 | 6/2015 | Horstman |
| 2017/0313304 A1* | 4/2017 | Shiraishi ............... B60W 10/18 701/41 |

OTHER PUBLICATIONS

Communication dated Jun. 3, 2020 from the State Intellectual Property Office of People's Republic of China in application No. 201910293100.0 English Translation.

\* cited by examiner

AUTOMATIC TILTING VEHICLE

CROSS-REFERENCE TO RELATED APPLICATION

The disclosure of Japanese Patent Application No. JP2018-82359 filed on Apr. 23, 2018 is incorporated by reference in its entirety.

BACKGROUND

1. Technical Field

The present disclosure relates to an automatic tilting vehicle that automatically tilts (self inclines) to the inside of a turn when turning.

2. Description of the Related Art

An automatic tilting vehicle has a vehicle tilting device, and the vehicle is automatically tilted to the inner side of a turn by the vehicle tilting device at the time of turning. For example, Proceedings of the Japan Society of Mechanical Engineers, Japan, The Japan Society of Mechanical Engineers, 2015, Vol. 81, No. 826 describes an automatic tilting vehicle that includes a pair of front wheels that are non-steered wheels spaced laterally, a rear wheel that is a steered wheel, a vehicle tilting device, and a control unit that controls the vehicle tilting device, and the pair of front wheels are rotatably supported by corresponding knuckles.

The vehicle tilting device includes a swing member swingable about a swing axis extending in a longitudinal direction of the vehicle, a tilt actuator that swings the swing member about the swing axis, and a pair of tie rods. The pair of tie rods are pivotally connected at the upper ends to outer ends of the swing member and pivotally connected at the lower ends to the corresponding knuckles. The left and right front wheels are vertically displaceable relative to a vehicle body, but are suspended from the vehicle body by the front wheel suspensions so that lateral displacement and inclination relative to the vehicle body are limited. Each front wheel suspension includes a shock absorber and a suspension spring disposed between the actuator and the vehicle body.

When the swing member swings about the pivot axis, the pair of tie rods vertically move in opposite directions to each other, so that the front wheels move up and down in opposite directions relative to a vehicle body, thereby the vehicle inclines in a lateral direction. The control unit calculates a target tilt angle of the vehicle for stably turning the vehicle based on a steering operation amount of the driver and a vehicle speed and controls a swing angle of the swing member by the tilt actuator so as to tilt the vehicle so that a tilt angle of the vehicle conforms to the target tilt angle.

Also in an automatic tilting vehicle, when braking/driving forces act on the pair of front wheels, vertical forces are generated on the pair of front wheels by suspensions and transmitted to a vehicle body via the pair of tie rods. Generally, since instantaneous centers of the left and right front wheels are located above ground contact points of the wheels when viewed in the lateral direction of the vehicle, even if the braking/driving forces of the left and right front wheels are the same, when the wheel bounces, a height of the instantaneous center relative to the wheel decreases and the vertical force decreases, while on the other hand, when the wheel rebounds, the height of the instantaneous center relative to the wheel increases and the vertical force increases.

As described above, in the automatic tilting vehicle, the vehicle is tilted turning inward by the opposite relative displacements of the left and right front wheels in the vertical direction with respect to the vehicle body, so that the front wheel on the turning inner side bounces, and the front wheel on the turning outer side rebound. Therefore, since a magnitude of the vertical force on the turning outer side is larger than a magnitude of the vertical force on the turning inner side, an extra roll moment caused by a difference between the left and right vertical forces acts on the vehicle.

In particular, since a tread of an automatic tilting vehicle is smaller than that of a typical passenger car or the like, the extra roll moment acts to change a tilt angle of the vehicle, so that even if the tilt angle of the vehicle is controlled to be a target tilt angle, the tilt angle may not be the target tilt angle.

SUMMARY

The present disclosure provides an automatic tilting vehicle which is improved to control a tilt angle of the vehicle to a target tilt angle with higher accuracy compared to the prior art and to enhance controllability of the tilt angle of the vehicle by correcting braking/driving forces of a pair of wheels so that an extra roll moment is reduced.

According to the present disclosure, an automatic tilting vehicle is provided that includes a pair of wheels that are non-steering driving wheels laterally spaced, a braking/driving device for applying braking/driving forces to the pair of wheels, a vehicle tilting device that is configured to tilt the vehicle by displacing the pair of wheels in the vertical direction opposite to each other with respect to a vehicle body, and a control unit for controlling the braking/driving device and the vehicle tilting device.

The control unit is configured to decreasingly correct a target braking/driving force of a turning outer wheel of the pair of wheels and increasingly correct a target braking/driving force of a turning inner wheel of the pair of wheels so that a difference in vertical forces acting on the pair of wheels due to the braking/driving forces of the pair of wheels is reduced.

According to the above configuration, a target braking/driving force of a turning outer wheel of the pair of wheels is decreasingly corrected and a target braking/driving force of a turning inner wheel of the pair of wheels is increasingly corrected so that a difference in vertical forces acting on the pair of wheels due to the braking/driving forces of the pair of wheels is reduced. Consequently, compared to where target braking/driving forces are not corrected, a magnitude of an extra roll moment due to a difference between the vertical forces is smaller. Therefore, since an effect that the extra roll moment tries to change the tilt angle of the vehicle is reduced, a tilt angle of the vehicle can be precisely controlled to a target tilt angle as compared with the conventional automatic tilting vehicle, and the controllability of the tilt angle of the vehicle can be enhanced.

In one aspect of the present disclosure, the control unit is configured to calculate a reduction correction amount of the target braking/driving force of the turning outer wheel and an increase correction amount of the target braking/driving force of the turning inner wheel based on the tilt angle of the vehicle so that a magnitudes of the target braking/driving force correction amounts increase as a tilt angle of the vehicle increases.

A decrease amount of the vertical force of the turning inner wheel is larger as a bound amount of the turning inner wheel is larger, and an increase amount of the vertical force of the turning outer wheel is larger as a rebound amount of the turning outer wheel is larger. The bound amount of the turning inner wheel and the rebound amount of the turning outer wheel are larger as the tilt angle of the vehicle is larger. Therefore, as the magnitude of the tilt angle of the vehicle increases, the decrease amount of the vertical force of the turning inner wheel and the increase amount of the vertical force of the turning outer wheel increase, so that a magnitude of the extra roll moment caused by a difference between the vertical forces increases.

According to the above aspect, a reduction correction amount of the target braking/driving force of the turning outer wheel and an increase correction amount of the target braking/driving force of the turning inner wheel are calculated based on a tilt angle of the vehicle so that the magnitudes of the target braking/driving force correction amounts increase as the tilt angle of the vehicle increases. Therefore, as the larger the magnitude of the tilt angle of the vehicle is, that is, the larger a difference between the vertical forces when the target braking/driving force is not corrected is, the reduction correction amount of the target braking/driving force of the turning outer wheel and the increase correction amount of the target braking/driving force of the turning inner wheel can be made larger. Therefore, even if a magnitude of the tilt angle of the vehicle is increased, a difference between the vertical forces is small compared to the conventional automatic tilting vehicle, so that it can be effectively prevented that a magnitude of an extra roll moment caused by a difference between the vertical forces is increased.

In another aspect of the present disclosure, the magnitude of the reduction correction amount of the target braking/driving force of the turning outer wheel and the magnitude of the increase correction amount of the target braking/driving force of the turning inner wheel are the same.

According to the above aspect, the magnitude of the reduction correction amount of the target braking/driving force of the turning outer wheel and the magnitude of the increase correction amount of the target braking/driving force of the turning inner wheel can be made the same. Consequently, even if one of the target braking/driving forces of the pair of wheels is corrected to be increased and the other of the target braking/driving forces of the pair of wheels is corrected to be decreased, a target braking/driving force of the entire vehicle does not increase or decrease. Therefore, it is possible to avoid unnatural acceleration/deceleration of the vehicle due to increase/decrease correction of the target braking/driving forces of the pair of wheels.

In another aspect of the present disclosure, the vehicle has at least one steering wheel spaced in the front-rear direction with respect to the pair of wheels, and the control unit is configured to calculate a target steered angle of the steered wheel based on a steering operation of a driver, correct the target steered angle so as to cancel at least a part of a yaw moment caused by the correction of the braking/driving forces of the pair of wheels, and control a steered angle of the steered wheels based on the corrected target steered angle.

According to the above aspect, a target steered angle of the steered wheel is calculated based on a steering operation of a driver, the target steered angle is corrected so as to cancel at least a part of a yaw moment caused by the correction of the braking/driving forces of the pair of wheels, and a steered angle of the steered wheels is controlled based on the corrected target steered angle. Therefore, the possibility that the yaw rate of the vehicle unnaturally changes due to an unnecessary yaw moment can be reduced. In addition, an amount of correction steering that the driver must perform to cancel an unnecessary yaw moment can be reduced, so that the driver's steering load can be reduced.

In another aspect of the present disclosure, a magnitude of the correction amount of the target steered angle is variably set according to a vehicle speed so as to decrease as the vehicle speed increases.

According to the above aspect, a magnitude of the correction amount of the target steered angle decreases as a vehicle speed increases. Therefore, in a low to middle vehicle speed region, a steered angle of the steered wheels can be corrected to increase a magnitude of the correction amount of the target steered angle to effectively cancel an unnecessary yaw moment caused by the increase/decrease correction of the braking/driving forces of the pair of wheels. On the contrary, in a high vehicle speed region, a magnitude of the correction amount of the target steered angle can be reduced to effectively reduce the possibility of excessive correction of the steered angle of the steered wheel.

Other objects, other features and attendant advantages of the present disclosure will be readily understood from the description of the embodiments of the present disclosure described with reference to the following drawings.

DETAILED DESCRIPTION

The present disclosure will now be described in detail with reference to the accompanying drawings.

Figure 1:
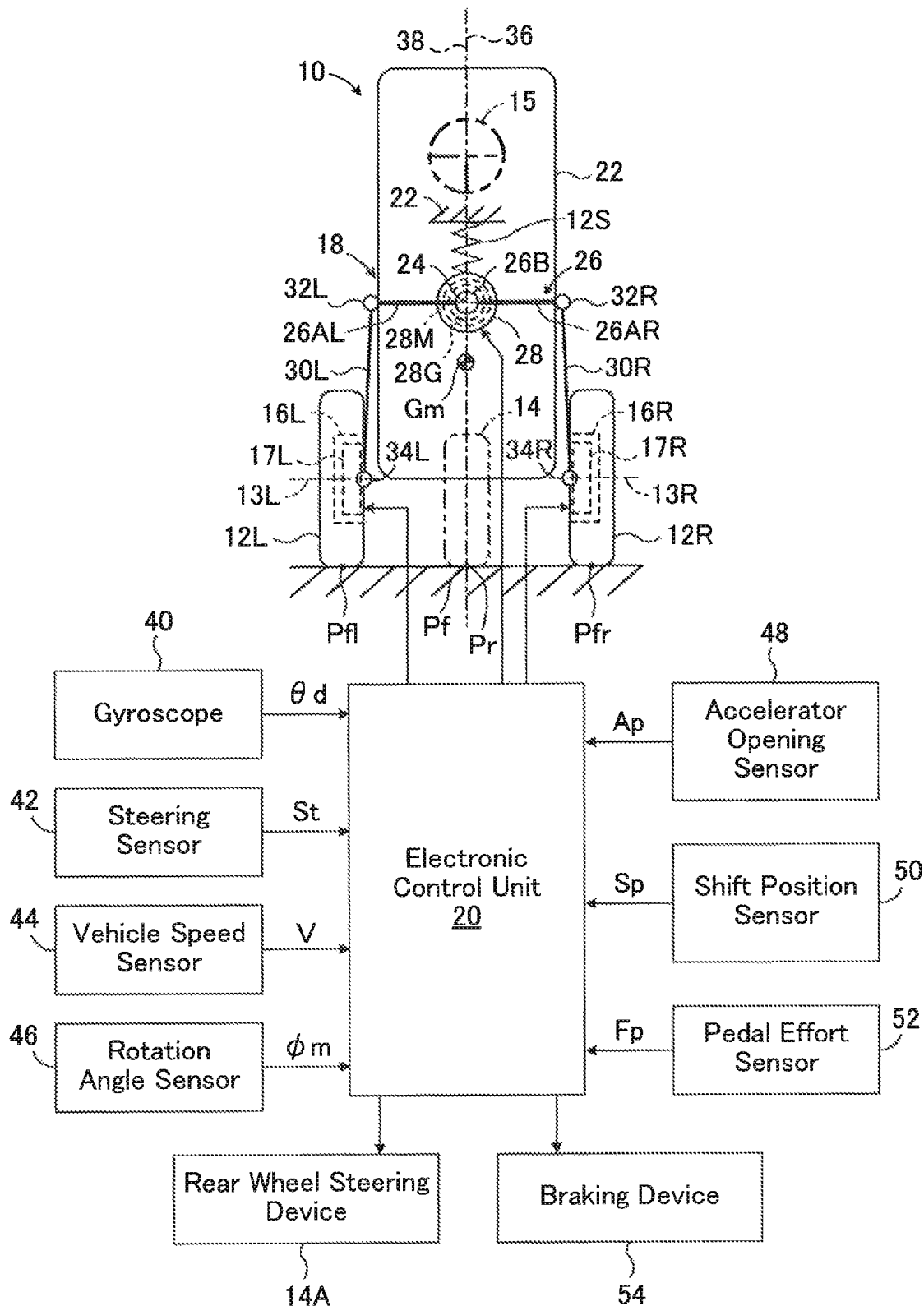
FIG. 1 is a schematic rear view of an embodiment of an automatic tilting vehicle according to the disclosure, cut away in a longitudinal section at the position of front wheels.
Figure 2:
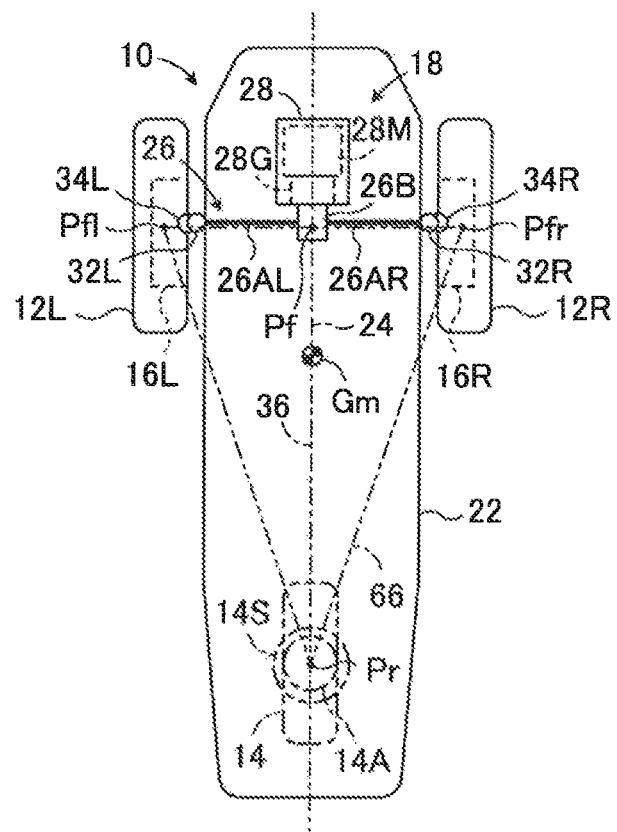
FIG. 2 is a schematic plan view of the embodiment of an automatic tilting vehicle according to the disclosure.
Figure 3:
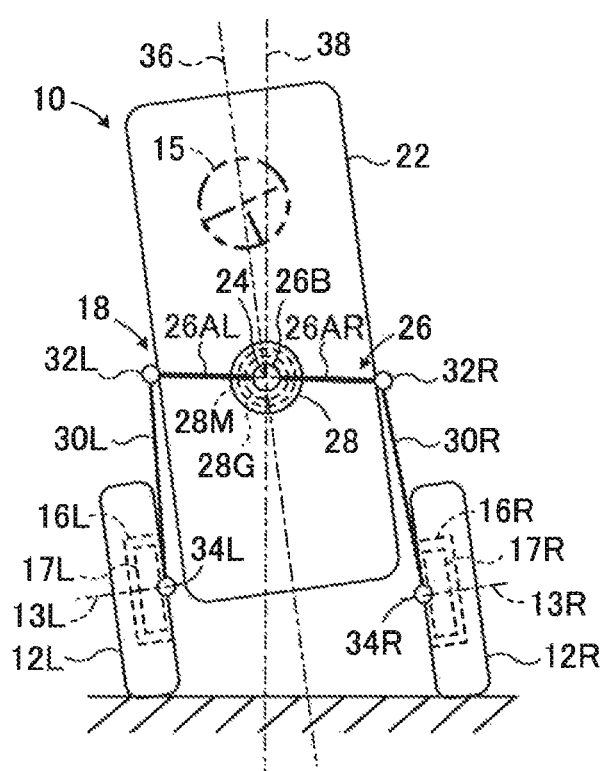
FIG. 3 is a rear view showing the embodiment when turning to the left in a longitudinal cross section at the position of the front wheels.

In FIGS. 1 and 2, an automatic tilting vehicle 10 according to an embodiment of the present disclosure is a three-wheeled vehicle with a riding capacity of one person that includes a pair of front wheels 12L and 12R which are non-steered driving wheels and a single rear wheel 14 which is a steered driven wheel. The front wheels 12L and 12R are spaced apart from each other in the lateral direction of the vehicle 10 and are rotatably supported by corresponding carriers 16L and 16R about rotation axes 13L and 13R, respectively. The rear wheel 14 is arranged to be steered by a rear wheel steering device 14A (see FIG. 2) according to an amount of operation of a steering wheel 15 by a driver. In FIGS. 1 and 3, the steering wheel 15 is shown in a position different from an actual position. The automatic tilting vehicle 10 further includes a vehicle tilting device 18 and an electronic control unit 20.

In the embodiment, although not shown in FIG. 2, the carriers 16L and 16R incorporate in-wheel motors 17L and 17R, respectively that serve as driving devices. The carriers 16L and 16R are supported so as to be vertically displaceable with respect to a vehicle body 22 by corresponding suspension arms such as leading arms and to restrict lateral displacement and inclination with respect to the vehicle body 22.

The vehicle tilting device 18 includes a swing member 26 that swings about a swing axis 24 extending in the longitudinal direction of the vehicle, an actuator 28 that swings the swing member 26 about the swing axis 24, and a pair of tie rods 30L and 30R. The tie rods 30L and 30R extend substantially in the vertical direction on both lateral sides with respect to the swing axis 24 and are pivotally connected to the swing member 26 by joints 32L and 32R such as ball joints at the upper ends. Further, the tie rods 30L and 30R are pivotally connected to the corresponding carriers 16L and 16R by joints 34L and 34R such as ball joints at the lower ends, respectively.

The swing member 26 has a boss portion 26B rotatably supported about the swing axis 24 and arm portions 26AL and 26AR integrally formed with the boss portion 26B and extending in opposite directions from the boss portion 26B, and functions as a swing arm member that swings about the swing axis 24. The upper ends of the tie rods 30L and 30R are pivotally connected to the distal ends of the arm portions 26AL and 26AR, respectively.

A front wheel suspension 12S including a suspension spring and a shock absorber are interposed between a support member supporting the boss portion 26B and the actuator 28 and the vehicle body 22. Accordingly, the front wheels 12L, 12R and the vehicle tilting device 18 are suspended from the vehicle body 22 by the front wheel suspension 12S. It is to be noted that the front wheel suspension 12S is configured to prevent the vehicle tilting device 18 from inclining in the lateral direction with respect to the vehicle body 22. The rear wheel 14 is suspended from the vehicle body 22 by a rear wheel suspension 14S including a suspension spring and a shock absorbers.

Therefore, the front wheels 12L, 12R and the rear wheel 14 can move upward and downward with respect to the vehicle body 22 together with the vehicle tilting device 18, and the relative vibration of them is attenuated by the shock absorber. Although not shown in the drawings, as described later, as viewed in the lateral direction, instantaneous centers of the front wheels 12L and 12R are located above and behind corresponding ground contact points of the front wheels with a road surface. On the other hand, an instantaneous center of the rear wheel 14 is located above and in front of a ground contact point of the rear wheel with the road surface.

The actuator 28 is a rotary type actuator and includes an electric motor 28M and a reduction gear device 28G. Rotational motion of a rotor of the electric motor 28M is decelerated by the reduction gear device 28G and is transmitted to the swing member 26. Note that the actuator 28 may be a reciprocating type actuator, and reciprocating motion of the actuator may be converted into a rotational motion by a motion converting mechanism and transmitted to the swing member 26.

As shown in FIG. 3, when the swing member 26 swings about the swing axis 24, the tie rods 30L and 30R vertically move in mutually opposite directions, so that the front wheels 12L and 12R vertically move in mutually opposite directions with respect to the vehicle body 22, whereby the vehicle 10 is tilted in the lateral direction. A rate of change of a tilt angle θ of the vehicle (an angle formed by a center plane 36 in the vertical direction of the vehicle 10 with respect to the vertical direction 38), that is, a tilt angular velocity θd of the vehicle is detected by a gyroscope 40. A signal indicating a tilt angular velocity θd of the vehicle detected by the gyroscope 40 is input to the electronic control unit 20.

The tilt angle θ becomes zero when the swing angle of the swing member 26 is zero and the center plane 36 coincides with the vertical direction 38 and assumes a positive value when the vehicle 10 is tilted so that the vehicle 10 is inclined to the left as viewed from the rear of the vehicle. Since a tilt angle θ of the vehicle 10 is substantially the same as a roll angle α, not shown, of the vehicle body 22, a roll angle α of the vehicle body may be detected by a roll angle sensor, and a roll angle α may be set as a tilt angle θ.

A steering angle St equal to a rotation angle of the steering wheel 15 is detected by a steering angle sensor 42. A signal indicating a steering angle St detected by the steering angle sensor 42 and a signal indicating a vehicle speed V detected by a vehicle speed sensor 44 are input to the electronic control unit 20. A signal indicating a rotation angle φm of the electric motor 28M detected by a rotation angle sensor 46 is also input to the electronic control unit 20. The vehicle speed V assumes a positive value when the vehicle moves forward, and assumes a negative value when the vehicle moves backward. The rotation angle φm becomes zero when the swing angle of the swing member 26 is zero, and assumes a positive value and a negative value when the swing member 26 swings so that the vehicle 10 is tilted to the left and right, respectively, as viewed from the rear of the vehicle.

Figure 12:
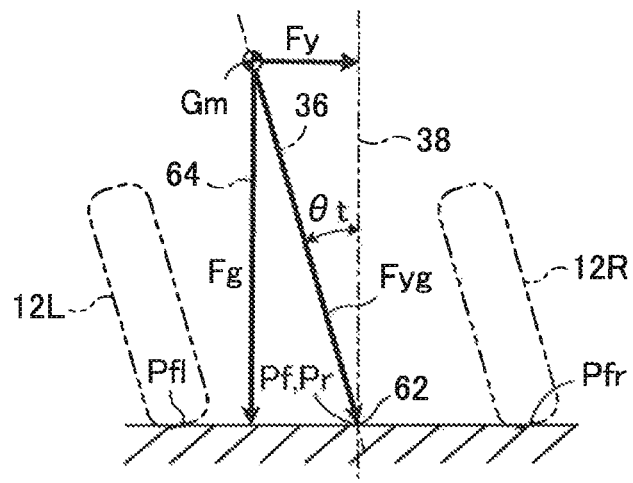
FIG. 12 is an explanatory view showing a procedure of calculating a target tilt angle θt of the vehicle for tilting the vehicle turning inward.
Figure 13:
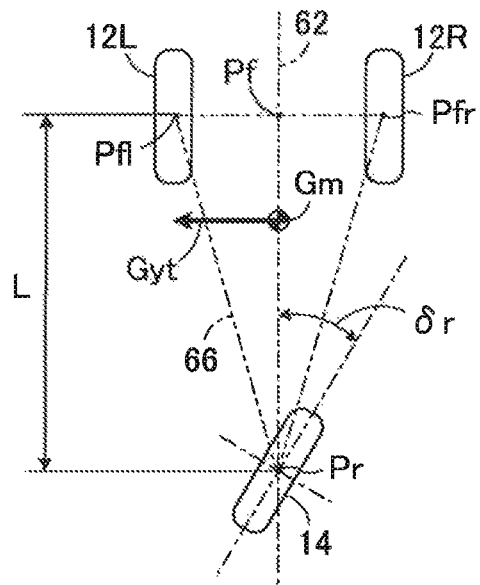
FIG. 13 is a plan view for explaining a wheel base of the vehicle and a steered angle δr of the rear wheel.

As shown in FIG. 12, a centrifugal force acting on a center of gravity Gm due to turning of the vehicle 10 is assumed to be Fy. As shown in FIG. 13, a straight line connecting a middle point Pf of ground contact points Pfl and Pfr of the left and right front wheels 12L and 12R and a ground contact point Pr of the rear wheel 14 is defined as a straight line 62. The electronic control unit 20 calculates a target tilt angle θt for tilting the vehicle 10 turning inward so that a resultant force Fyg of the centrifugal force Fy and a gravity force Fg acts in a direction toward the straight line 62 (herein referred to as "predetermined direction"). In the present specification, a triangle formed by straight lines connecting the ground contact points Pfl and Pfr and the ground contact point Pr is referred to as a triangle 66.

Figure 4:
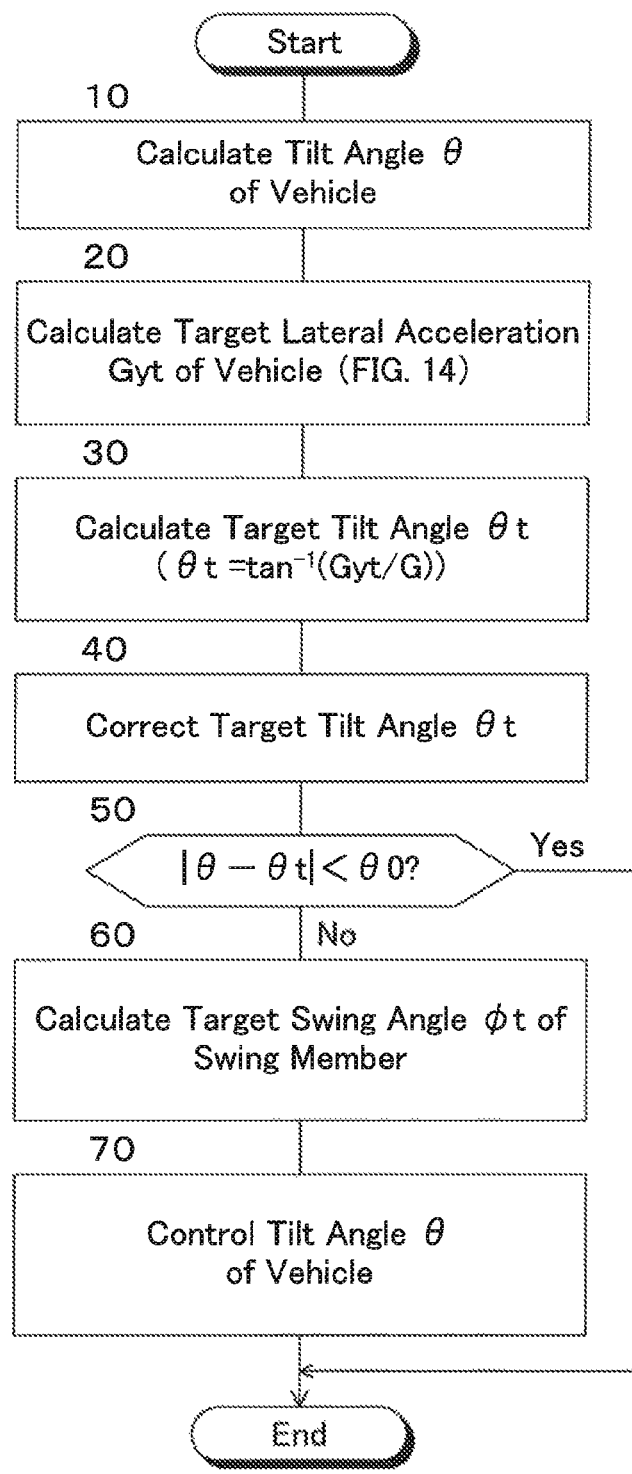
FIG. 4 is a flow chart showing a control routine of a tilt angle θ of the vehicle in the embodiment.

Specifically, the electronic control unit 20 calculates a target lateral acceleration Gyt of the vehicle based on a steering angle St and a vehicle speed V according to the flowchart shown in FIG. 4. Further, the electronic control unit 20 calculates a target tilt angle θt based on a ratio Gyt/G of the target lateral acceleration Gyt to the gravitational acceleration G and controls a rotation angle φm of the electric motor 28M of the actuator 28 so that a tilt angle θ of the vehicle conforms to the target tilt angle θt. Therefore, the electronic control unit 20 functions as a control unit configured to tilt the vehicle 10 by controlling the swing angle φ of the swing member 26 of the vehicle tilting device 18.

Figure 15:
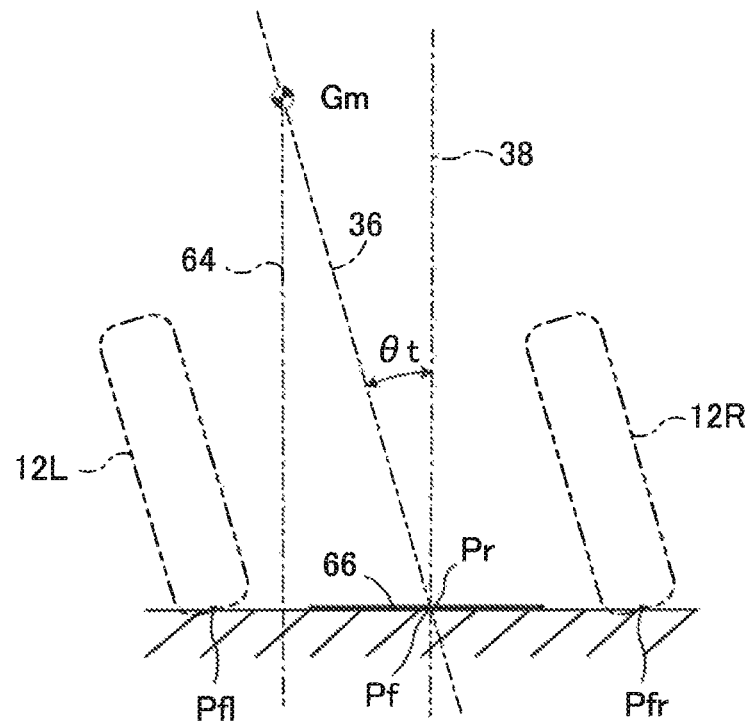
FIG. 15 is a rear vertical cross-sectional view showing a situation in which a vertical line passing through a center of gravity of the vehicle turning left passes out of a triangular range connecting ground contact points of the left and right front wheels and a ground contact point of the rear wheels.
Figure 16:
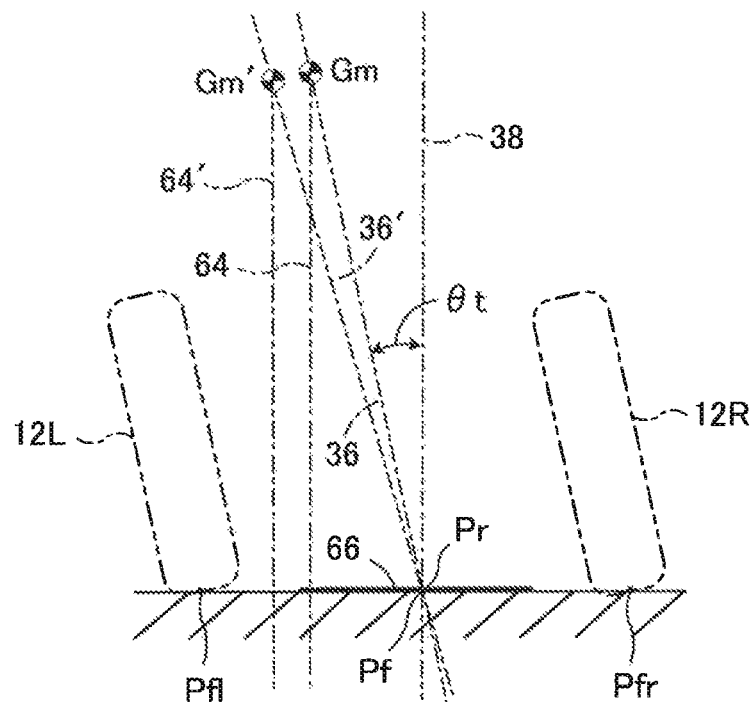
FIG. 16 is a rear vertical cross-sectional view showing a situation in which a target tilt angle of the vehicle is corrected to be reduced so that a vertical line passing through the center of gravity of the vehicle turning left passes inside a margin of the triangular range connecting the ground contact points of the left and right front wheels and the ground contact point of the rear wheels.

When, as shown in FIG. 15, a perpendicular line 64 passing through the center of gravity Gm of the vehicle 10 passes outside the range of the triangle 66 (see FIGS. 2 and 13) or through a predetermined tolerable margin, the electronic control unit 20 decreasingly corrects the target tilt angle θt in magnitude so that, as shown in FIG. 16, the perpendicular line 64 passes inside the tolerable margin. Therefore, the tilt angle of the vehicle when the perpendicular line 64 passes inside an oblique side of the triangle 66 by a distance of the predetermined tolerable margin being referred to as a maximum allowable tilt angle θamax, the target tilt angle θt is corrected as necessary so that a magnitude of the target tilt angle does not exceed the maximum allowable tilt angle θamax. Notably, the predetermined margin is preset in consideration of manufacturing tolerances of various members and the like. Further, in FIG. 16, the positions of the center of gravity Gm, the center plane 36 and the perpendicular line 64 shown in FIG. 15 are indicated by reference symbols Gm', 36' and 64', respectively.

Figure 11:
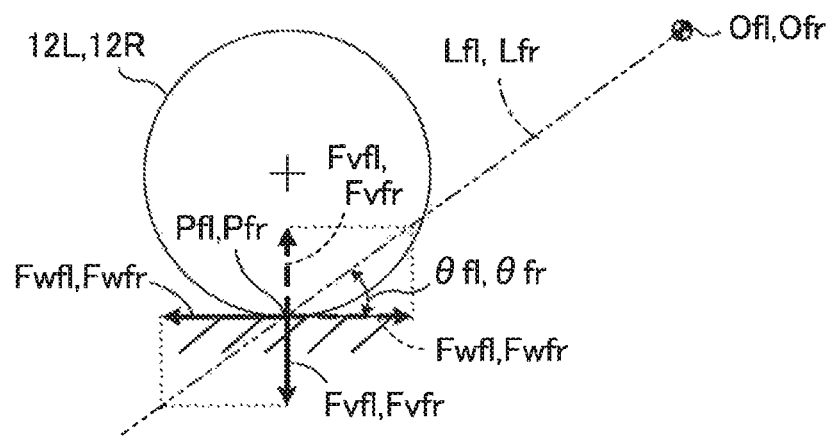
FIG. 11 is a diagram showing vertical forces generated by driving forces (solid line) and braking forces (dotted line) of the front wheels.

As shown in FIG. 11, as viewed in the lateral direction of the vehicle, the instantaneous centers of the front wheels 12L and 12R are represented by Ofl and Ofr. In the illustrated embodiment, the instantaneous centers Ofl and Ofr are located behind and above the ground contact points Pfl and Pfr, respectively.

As shown by solid arrows in FIG. 11, when driving forces, ie, positive braking/driving forces Fwfl and Fwfr respectively act on front wheels 12L and 12R, downward vertical forces Fvfl and Fvfr act on the front wheels 12L and 12R at the ground contact points Pfl and Pfr, respectively. As shown by broken arrows in FIG. 11, when braking forces, that is, negative braking/driving forces Fwfl and Fwfr respectively act on the front wheels 12L and 12R, upward vertical forces Fvfl and Fvfr act on the front wheels 12L and 12R at the ground contact points Pfl and Pfr, respectively. These vertical forces Fvfl and Fvfr are transmitted to the swing member 26 via the tie rods 30L and 30R, respectively.

Let θfl and θfr be angles formed by line segments Lfl and Lfr connecting the instantaneous centers Ofl and Ofr with the ground contact points Pfl and Pfr, respectively, and let the upward vertical force be a positive value. The vertical forces Fvfl and Fvfr are represented by the following equations (1) and (2), respectively. The braking/driving forces Fwfl and Fwfr are positive values when they are driving forces and negative values when they are braking forces.

$$Fvfl = -Fwfl \cdot \tan \theta fl \quad (1)$$

$$Fvfr = -Fwfr \cdot \tan \theta fr \quad (2)$$

As understood from the above equations (1) and (2), if the magnitudes of the braking/driving forces Fwfl and Fwfr are the same and the angles θfl and θfr are the same, the magnitudes of the vertical forces Fvfl and Fvfr are also the same. However, even if the driving forces or braking forces of the left and right front wheels 12L and 12R are the same, when the vehicle 10 is tilted, the angles θfl and θfr are different, so the magnitudes of the vertical forces Fvfl and Fvfr are also different. In particular, the angles θfl and θfr become smaller as the wheel bounces and become larger as the wheel rebounds, so the vertical forces Fvfl and Fvfr become smaller at the turning inner wheel and larger at the turning outer wheel.

When magnitudes of the vertical forces Fvfl and Fvfr are different from each other, the forces transmitted to the swing member 26 through the tie rods 30L and 30R are different, so that an extra moment acts on the swing member 26 around the swing axis 24. Therefore, even if the electronic control unit 20 controls the vehicle tilting device 18 so that the tilt angle θ of the vehicle becomes the target tilt angle θt, it is difficult to accurately control the tilt angle θ of the vehicle to the target tilt angle θt.

Figure 5:
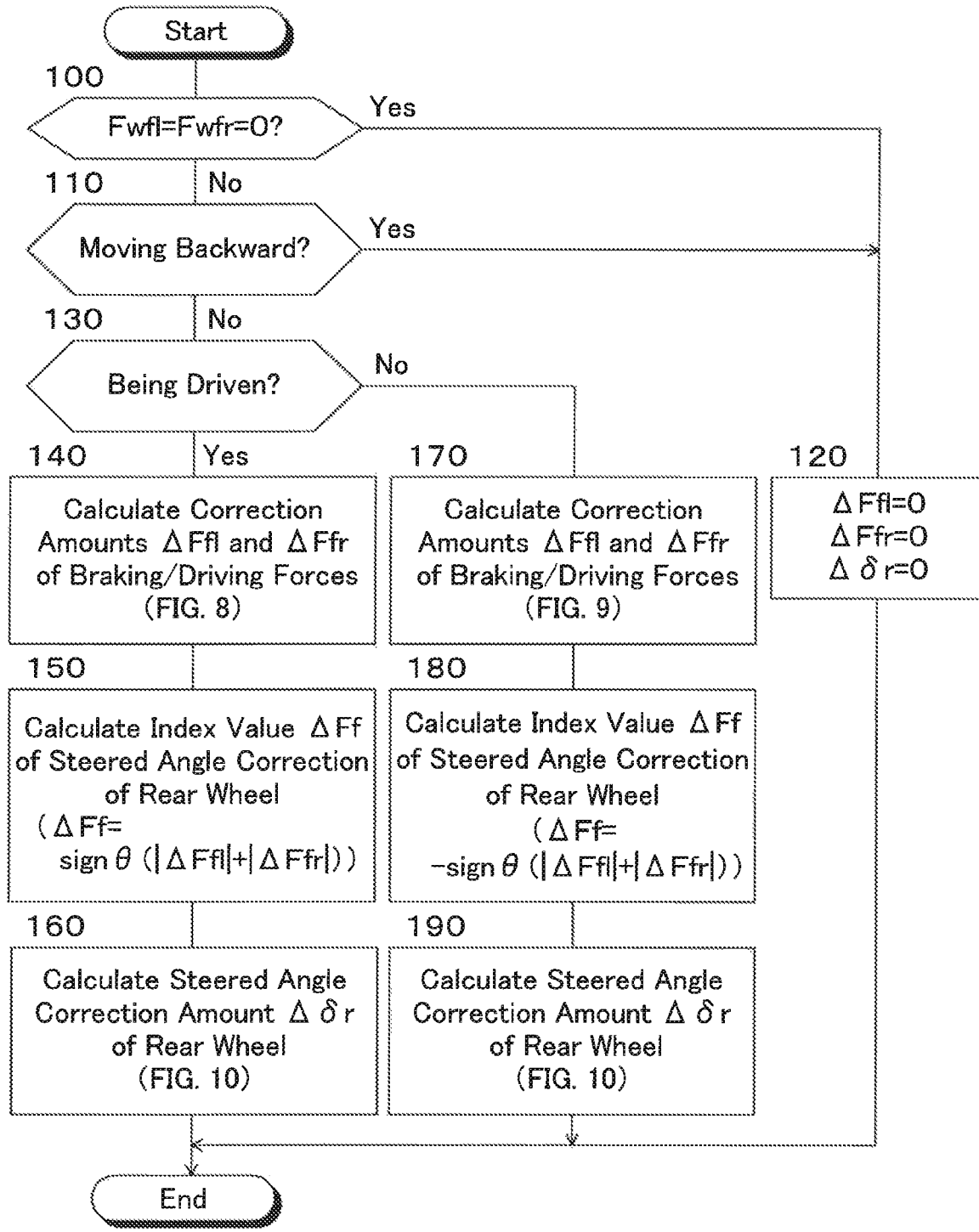
FIG. 5 is a flowchart showing a calculation routine of correction amounts ΔFfl and ΔFfr of target braking/driving forces of left and right front wheels and correction amount Δδr of target steered angle δrt of a rear wheel in the embodiment.

In order to cope with this problem, the electronic control unit 20 follows the flow chart shown in FIG. 5 to calculate correction amounts ΔFfl and ΔFfr of the braking/driving forces of the left and right front wheels 12L and 12R so that a magnitude of an extra moment caused by the difference between vertical force Fvfl and Fvfr decreases.

The electronic control unit 20 receives, from an accelerator opening sensor 48, a signal indicating an accelerator opening Ap which is an amount of depression operation of an accelerator pedal (not shown) operated by a driver. The electronic control unit 20 receives, from a shift position sensor 50, a signal indicating a shift position Sp which is an operating position of a shift lever (not shown) operated by the driver. Further, to the electronic control unit 20, a signal indicating a pedal effort Fp on a brake pedal (not shown) by the driver is inputted from a pedal effort sensor 52.

Figure 6:
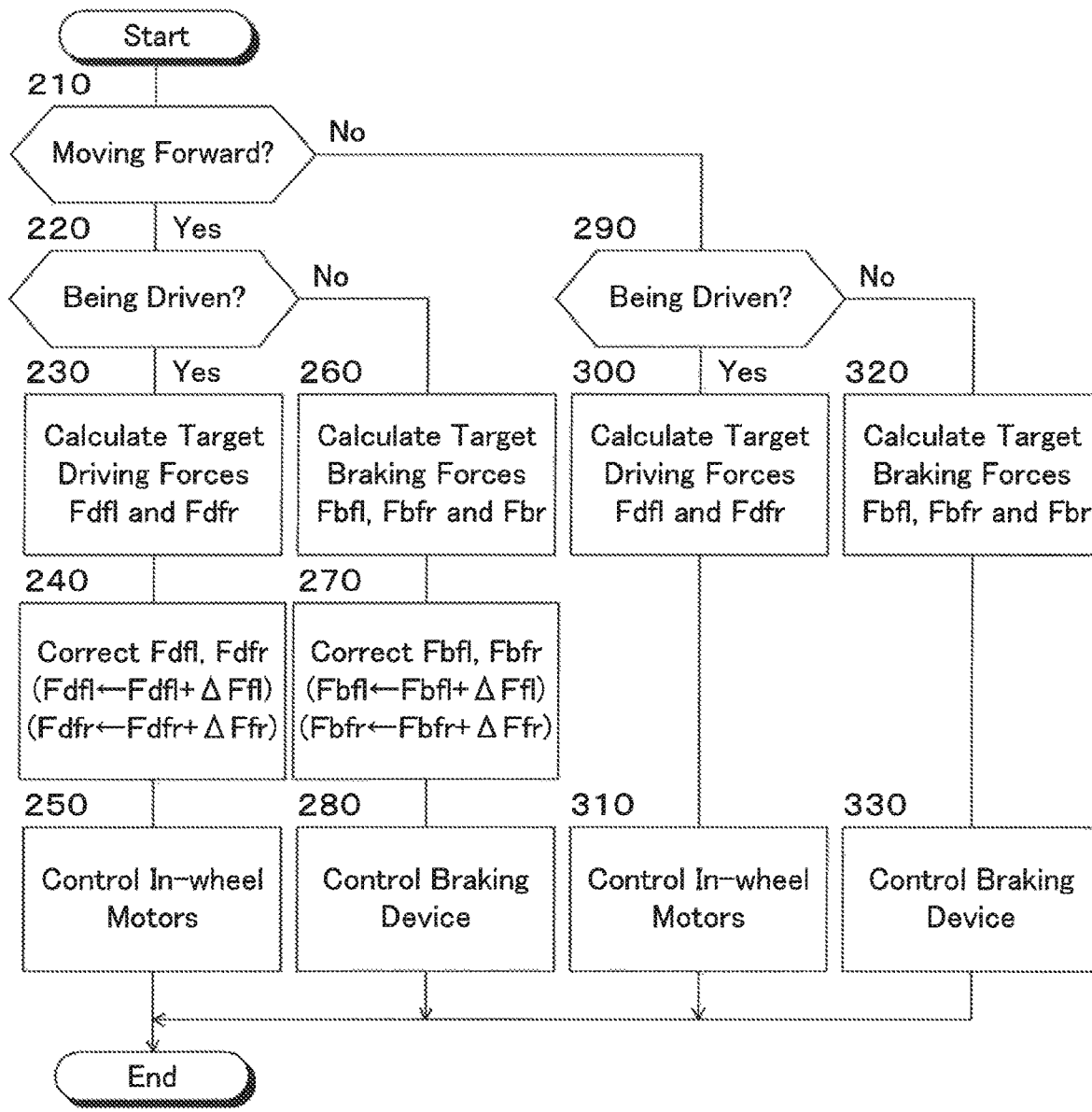
FIG. 6 is a flow chart showing a control routine of braking/driving forces Fwfl and Fwfr of left and right front wheels in the embodiment.

When the vehicle is moving forward with driving force, the electronic control unit 20 calculates, according to the flowchart shown in FIG. 6, target driving forces Fdfl and Fdfr of the left and right front wheels 12L and 12R based on an accelerator opening Ap and a shift position Sp. Then, the electronic control unit 20 corrects the target driving forces Fdfl and Fdfr with driving force correction amounts ΔFfl and ΔFfr, respectively, and controls outputs of the in-wheel motors 17L and 17R based on the corrected target driving forces to control driving forces of the front wheels 12L and 12R. Notably, when the vehicle is moving backward, the electronic control unit 20 controls driving forces of the front wheels 12L and 12R by controlling the outputs of the in-wheel motors based on the target driving forces Fdfl and Fdfr.

Similarly, when the vehicle is moving forward without driving force, the electronic control unit 20 calculates target braking forces Fbfl and Fbfr of the left and right front wheels 12L and 12R based on a pedal effort Fp according to the flowchart shown in FIG. 6. Then, the electronic control unit 20 corrects the target braking forces Fbfl and Fbfr with braking force correction amounts ΔFfl and ΔFfr, respectively, and controls a braking device 54 based on the corrected target braking forces to control braking forces of the front wheels 12L, 12R and the rear wheel 14. During braking, regeneration may be performed by the in-wheel motors. Notably, when the vehicle is moving backward with braking, the electronic control unit 20 controls braking forces of the front wheels 12L, 12R and the rear wheel 14 by controlling the braking device 54 based on the target braking forces Fbfl and Fbfr.

As understood from the above description, the in-wheel motors 17L and 17R and the braking device 54 function as a braking/driving device that applies braking/driving forces to the left and right front wheels 12L and 12R in cooperation with each other. The braking/driving forces applied to the left and right front wheels 12L and 12R are controlled by the in-wheel motors 17L and 17R and the braking device 54 being controlled by the electronic control unit 20.

When the target driving forces Fdfl and Fdfr or the target braking forces Fbfl and Fbfr are corrected by the correction amounts ΔFfl and ΔFfr, respectively, the braking/driving forces of the left and right front wheels 12L and 12R are not the same so that an extra yaw moment acts on the vehicle 10. Therefore, the electronic control unit 20 calculates a correction amount Δδr of a steered angle δr of the rear wheel 14 so that a yaw moment that opposes the extra yaw moment is given to the vehicle according to the flowchart shown in FIG. 5.

Figure 7:
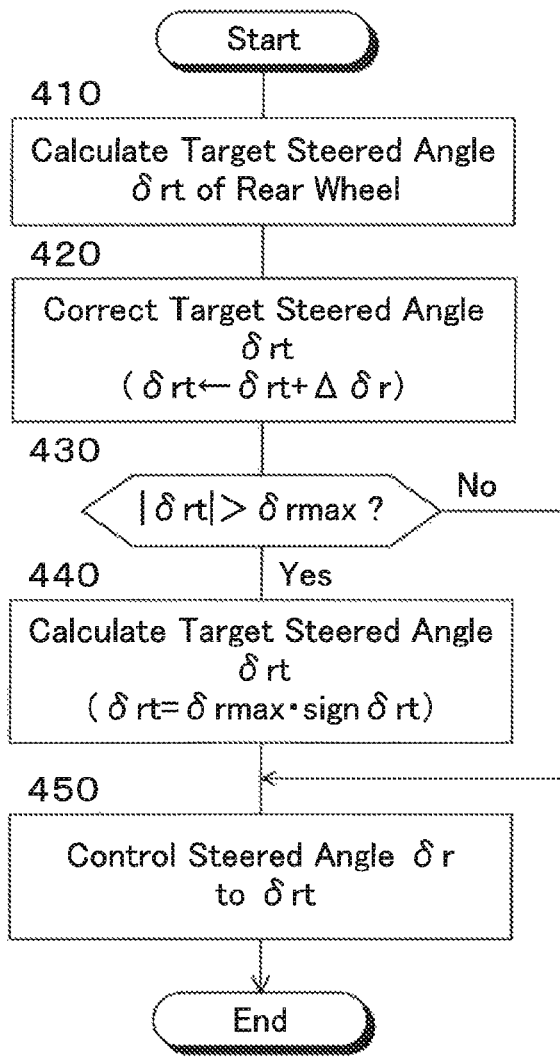
FIG. 7 is a flowchart showing a control routine of a steered angle δr of the rear wheel in the embodiment.

Further, the electronic control unit 20 calculates a target steered angle δrt of the rear wheel 14 based on a steering angle St and a vehicle speed V according to the flowchart shown in FIG. 7. The electronic control unit 20 corrects the target steered angle δrt with the correction amount Δδr, and controls the rear wheel steering device 14A such that a steered angle δr of the rear wheel 14 becomes the corrected target steered angle.

Although the electronic control unit 20 and the sensors such as the gyroscope 70 are shown outside the vehicle 10 in FIG. 1, they are mounted on the vehicle 10. The electronic control unit 20 may be a microcomputer having, for example, a CPU, a ROM, a RAM, and an input/output port device, which are connected to each other by a bi-directional common bus. The control program corresponding to the flowcharts shown in FIGS. 4 to 7 are stored in the ROM, and the tilt angle 9 of the vehicle 10 and the like are controlled by the CPU according to the control programs. The microcomputer performing the controls according to the flowcharts shown in FIGS. 6 and 7 may be different from the microcomputer performing the controls of the braking/driving forces and the control of the steered angle of the rear wheel according to the flowcharts shown in FIGS. 4 and 5.

<Vehicle Tilt Angle Control Routine>

Next, the tilt angle control routine of the vehicle in the embodiment will be described with reference to the flowchart shown in FIG. 4. The tilt angle control according to the flowchart shown in FIG. 4 is repeatedly executed at predetermined time intervals when an ignition switch (not shown) is ON. The same applies to the other controls according to the flowcharts shown in FIGS. 5 to 7.

First, in step 10, a tilt angle θ of the vehicle 10 is calculated by integrating the tilt angular velocity d of the vehicle detected by the gyroscope 70. When the gyroscope 70 outputs a signal indicating the tilt angle θ of the vehicle 10, integration of the tilt angular velocity d is unnecessary.

Figure 14:
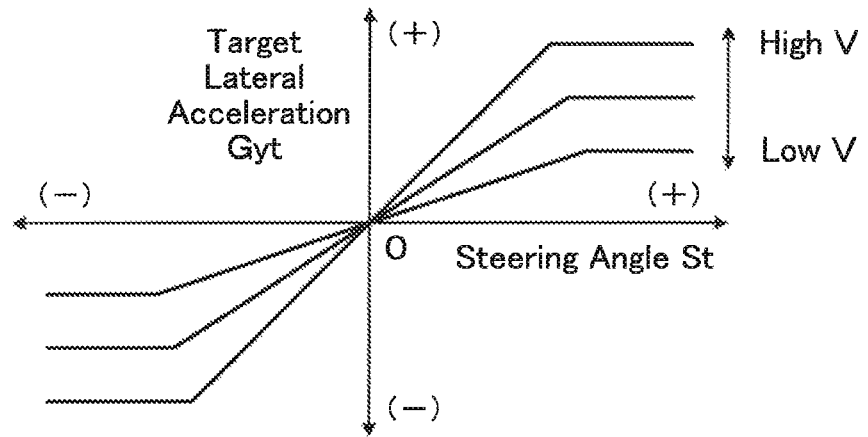
FIG. 14 is a map for calculating a target lateral acceleration Gyt of the vehicle based on a steering angle St and a vehicle speed V.

In step 20, a map shown in FIG. 14 is referred to based on a steering angle St and a vehicle speed V, whereby a target lateral acceleration Gyt is calculated. Incidentally, as shown in FIG. 14, a target lateral acceleration Gyt is calculated such that the larger an absolute value of the steering angle St is, the larger the magnitude is, and the larger the vehicle speed V is, the larger the magnitude is. Further, a target lateral acceleration Gyt may be calculated by a function having a steering angle St and a vehicle speed V as variables.

In step 30, a target tilt angle θt of the vehicle for tilting the vehicle 10 toward the turning inner side is calculated according to the following equation (3). The gravitational acceleration G in the following equation (3) may be a positive constant.

$$\theta t = \tan^{-1}(Gyt/G) \quad (3)$$

In step 40, when a magnitude of the target tilt angle θt of the vehicle exceeds the maximum allowable tilt angle θamax, the target tilt angle θt is corrected so that the magnitude becomes the maximum allowable tilt angle θamax. When the magnitude of the target tilt angle θt is equal to or less than the maximum allowable tilt angle θamax, that is, when the perpendicular line 64 passing through the center of gravity Gm of the vehicle 10 passes inside the tolerable margin of the triangle 66 which is not shown in the drawing, the target tilt angle θt of the vehicle is not corrected.

In step 50, it is determined whether or not an absolute value of a deviation θ−θt between the tilt angle θ of the vehicle 10 and the target tilt angle θt of the vehicle is smaller than a reference value θ0 (a positive constant). When an affirmative determination is made, since the correction of the tilt angle θ of the vehicle is unnecessary the control of the tilt angle is temporarily terminated, and when a negative determination is made, the control of the tilt angle proceeds to step 60.

In step 60, a target swing angle φt of the swing member 36 for setting the deviation θ−θt between the tilt angle θ of the vehicle 10 and the target tilt angle θt to zero is calculated and a target rotation angle φmt of the electric motor 38M of the tilt actuator 38 for achieving the target swing angle φt is calculated.

In step 70, the electric motor 38M is controlled so that a rotation angle φm of the electric motor 38M becomes the target rotation angle φmt so as to control the swing angle φ of the swing member 36 to the target swing angle φt, whereby the tilt angle θ of the vehicle 10 is controlled so as to be the target tilt angle θt.

As can be understood from the above description, in step 10, a tilt angle θ of the vehicle 10 is calculated based on the tilt angular velocity θd of the vehicle detected by the gyroscope 40, and in steps 20 and 30, a target tilt angle θt of the vehicle for tilting the vehicle inward is calculated. In step 40, a target tilt angle θt is corrected as necessary so that a magnitude of the target tilt angle θt of the vehicle does not exceed the maximum allowable tilt angle θamax. Furthermore, in steps 50 to 70, the swing angle φ of the swing member 26 is controlled by controlling the motor 28M of the actuator 28 for achieving the target swing angle φt such that a magnitude of the deviation θ−θt between the tilt angle θ of the vehicle 10 and the target tilt angle θt becomes smaller than the reference value θ0.

<Calculation Routine of Correction Amounts of Braking/Driving Forces and a Correction Amount of a Rear Wheel Steered Angle>

Next, with reference to the flowchart shown in FIG. 5, the calculation routine of correction amounts ΔFfl and ΔFfr of the target braking/driving forces of the left and right front wheels and a correction amount Δδr of the target steered angle δrt of the rear wheel will be described.

First, in step 100, it is determined whether or not the braking/driving forces Fwfl and Fwfr of the left and right front wheels are zero, that is, whether or not the vehicle is stopping or inertially running. When an affirmative determination is made, the control of the correction amounts calculation proceeds to step 120, and when a negative determination is made, the control of the correction amounts calculation proceeds to step 110.

In step 110, it is determined whether or not the vehicle 10 is moving backward based on, for example, the shift position Sp. When a negative determination is made, the control of the correction amounts calculation proceeds to step 130, and when an affirmative determination is made, the control of the correction amounts calculation proceeds to step 120.

In step 120, the correction amounts ΔFfl and ΔFfr of the target braking/driving forces of the left and right front wheels are set to zero, and the correction amount Δδr of the target steered angle δrt of the rear wheel is set to zero. Thereafter, the control of the correction amounts calculation is temporarily ended.

In step 130, it is determined whether or not the vehicle 10 is being driven based on, for example, an accelerator opening Ap. When a negative determination is made, the control of the correction amounts calculation proceeds to step 170, and when an affirmative determination is made, the control of the correction amounts calculation proceeds to step 140. Notably, in step 130, it may be determined whether or not the vehicle 10 is braked based on a pedal effort Fp, for example. When a negative determination is made, the control of the correction amounts calculation may proceed to step 140 and when an affirmative determination is made, the control of the correction amounts calculation may proceed to step 170.

Figure 8:
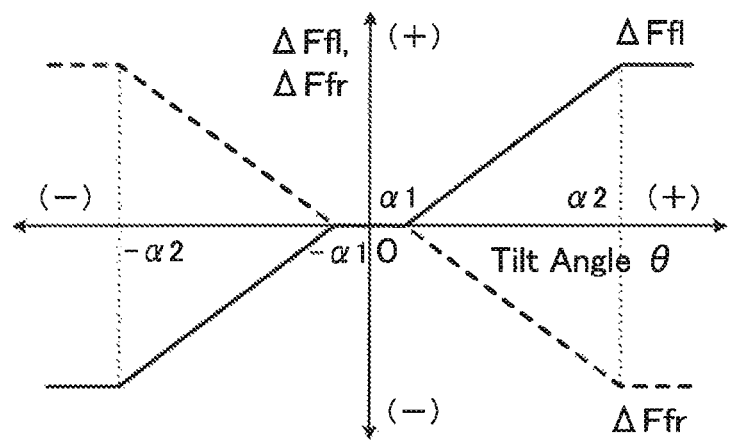
FIG. 8 shows a map for calculating correction amounts ΔFfl and ΔFfr of the braking/driving forces (driving forces) Ffl and Ffr of the left and right front wheels based on a tilt angle θ of the vehicle.

In step 140, by referring to the map shown in FIG. 8 based on the inclination angle θ of the vehicle 10 calculated in step 10 of the flowchart shown in FIG. 4, correction amounts ΔFfl and ΔFfr of the braking/driving forces (driving forces) Fwfl and Fwfr of the left and right front wheels are calculated.

As shown in FIG. 8, when the tilt angle θ is a positive value, the correction amounts ΔFfl and ΔFfr are zero in the range where the tilt angle θ is less than or equal to a reference value α1 (a positive constant). The correction amounts ΔFfl and ΔFfr are calculated as a positive value and a negative value, respectively, so that in the range where the tilt angle θ is larger than the reference value α1 and not larger than a reference value α2 (a positive constant), the magnitudes of the correction amounts ΔFfl and ΔFfr increase as the tilt angle θ increases and in the range where the tilt angle θ is larger than the reference value α2, the magnitudes of the correction amounts ΔFfl and ΔFfr are constant.

On the other hand, when the tilt angle θ is a negative value, the correction amounts ΔFfl and ΔFfr are zero when the tilt angle θ is in the range of the reference value −α1 or more. The correction amounts ΔFfl and ΔFfr are calculated as a negative value and a positive value, respectively, so that in the range where the tilt angle θ is smaller than the reference value −α1 and larger than or equal to the reference value −α2, the magnitudes of the correction amounts ΔFfl and ΔFfr increase as the tilt angle θ decreases, and in the range where the tilt angle θ is smaller than the reference value −α2, the magnitudes of the correction amounts ΔFfl and ΔFfr are constant.

In step 150, an index value ΔFf of the steered angle correction of the rear wheel 14 is calculated according to the following equation (4) based on a sum of the absolute value of the correction amount ΔFfl and the absolute value of the correction amount ΔFfr and the sign sign θ of the tilt angle θ of the vehicle 10.

$$\Delta Ff = \text{sign } \theta(|\Delta Ffl| + |\Delta Ffr|) \quad (4)$$

Figure 10:
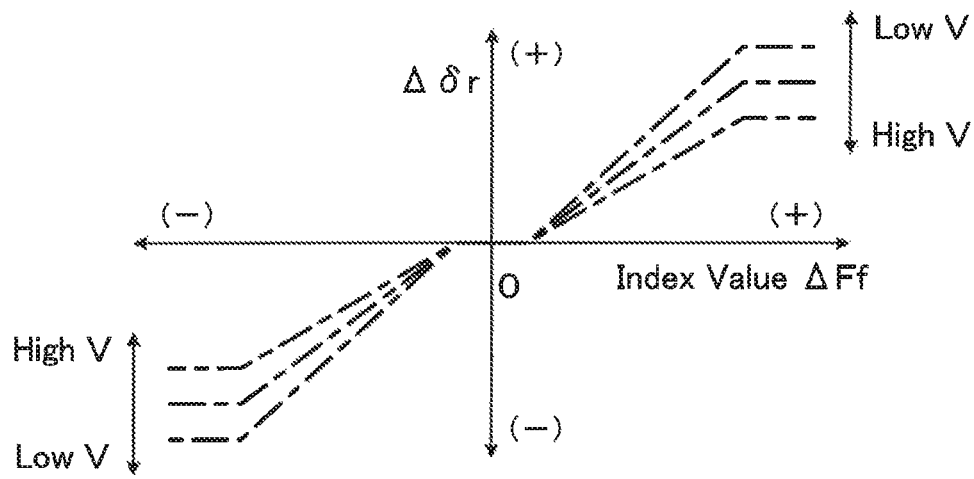
FIG. 10 shows a map for calculating a steered angle correction amount Δδr of the rear wheel 14 based on a steered angle correction index value ΔFf.

In step 160, a steered angle correction amount Δδr of the rear wheel 14 is calculated by referring to the map shown in FIG. 10 based on the steered angle correction index value ΔFf. As shown in FIG. 10, the steered angle correction amount Δδr is zero in the range where the index value ΔFf is small, but in the other ranges, when the index value ΔFf is positive and negative values, it becomes positive and negative values, respectively. Furthermore, the absolute value of the steered angle correction amount Δδr increases as the absolute value of the index value ΔFf increases, and increases as a vehicle speed V decreases.

Figure 9:
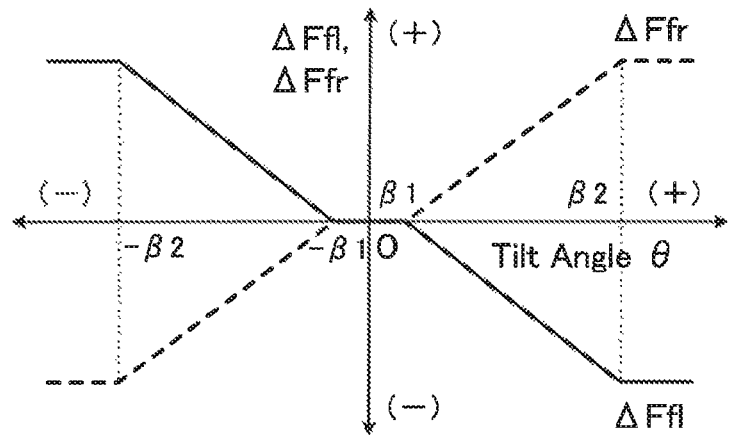
FIG. 9 shows a map for calculating correction amounts ΔFfl and ΔFfr of the braking/driving forces (braking forces) Ffl and Ffr of the left and right front wheels based on a tilt angle θ of the vehicle.

In step 170, as in step 140, by referring to the map shown in FIG. 9 based on the tilt angle θ, correction amounts ΔFfl and ΔFfr of the braking/driving forces (braking forces) Fwfl and Fwfr of the left and right front wheels are calculated.

As shown in FIG. 9, when the tilt angle θ is a positive value, the correction amounts ΔFfl and ΔFfr are zero in the range where the tilt angle θ is less than or equal to a reference value β1 (a positive constant). The correction amounts ΔFfl and ΔFfr are calculated as a negative value and a positive value, respectively, so that in the range where the tilt angle θ is larger than the reference value β1 and not larger than a reference value β2 (a positive constant), the magnitudes of the correction amounts ΔFfl and ΔFfr increase as the tilt angle θ increases and in the range where the tilt angle θ is larger than the reference value β2, the magnitudes of the correction amounts ΔFfl and ΔFfr are constant.

On the other hand, when the tilt angle θ is a negative value, the correction amounts ΔFfl and ΔFfr are zero when the tilt angle θ is in the range of the reference value −β1 or more. The correction amounts ΔFfl and ΔFfr are calculated as a negative value and a positive value, respectively, so that in the range where the tilt angle θ is smaller than the reference value −β1 and larger than or equal to the reference value −β2, the magnitudes of the correction amounts ΔFfl and ΔFfr increase as the tilt angle θ decreases, and in the range where the tilt angle θ is smaller than the reference value −β2, the magnitudes of the correction amounts ΔFfl and ΔFfr are constant. Note that β1 and β2 may be the same as α1 and α2, respectively, or may be different from α1 and α2, respectively.

In step 180, an index value ΔFf of the steered angle correction of the rear wheel 14 is calculated according to the following equation (5) based on an inverted value of a sum of the absolute value of the correction amount ΔFfl and the absolute value of the correction amount ΔFfr and the sign sign θ of the tilt angle θ of the vehicle 10.

$$\Delta Ff = -\text{sign } \theta(|\Delta Ffl| + |\Delta Ffr|) \quad (5)$$

In step 190, as in step 160, a steered angle correction amount Δδr of the rear wheel 14 is calculated by referring to the map shown in FIG. 10 based on the steered angle correction index value ΔFf.

<Control Routine of Braking/Driving Forces>

Next, the control routine of the braking/driving forces Fwfl and Fwfr of the left and right front wheels in the embodiment will be described with reference to the flowchart shown in FIG. 6.

First, in step 210, it is determined whether or not the vehicle 10 is moving forward based on, for example, the shift position Sp. When a negative determination is made, the control of the braking/driving forces proceeds to step 290, and when an affirmative determination is made, the control of the braking/driving forces proceeds to step 220.

In step 220, it is determined whether or not the vehicle 10 is being driven based on, for example, an accelerator opening Ap. When a negative determination is made, the control of the braking/driving forces proceeds to step 260, and when an affirmative determination is made, the control of the braking/driving forces proceeds to step 230. Notably, in step 220, it may be determined whether or not the vehicle 10 is braked based on a pedal effort Fp, for example. When a negative determination is made, the control of the braking/driving forces may proceed to step 230 and when an affirmative determination is made, the control of the braking/driving forces may proceed to step 260.

In step 230, target driving forces Fdfl and Fdfr are calculated based on an accelerator opening Ap such that the target driving forces Fdfl and Fdfr for the left and right front wheels become larger as the accelerator opening Ap increases. The target driving forces Fdfl and Fdfr are calculated to be half of a target driving force of the entire vehicle determined by the accelerator opening Ap.

In step 240, the target driving force Fdfl of the left front wheel is corrected to a sum of Fdfl and the correction amount ΔFfl calculated in step 140 of the flowchart shown in FIG. 5. Similarly, the target driving force Fdfr of the right front wheel is corrected to a sum of Fdfr and the correction amount ΔFfr calculated in step 140 of the flowchart shown in FIG. 5.

In step 250, the in-wheel motors 17L and 17R are controlled such that driving forces of the left and right front wheels 12L and 12R become the corrected target driving forces Fdfl and Fdfr, respectively.

In step 260, target braking forces Fbfl, Fbfr and Fbr are calculated based on the pedal effort Fp so that the target braking forces Fbfl and Fbfr for the left and right front wheels and the target braking forces Fbr for the rear wheel become larger as the pedal effort Fp increases. Notably, the target braking force of the front two wheels and the target braking force of the rear wheel are calculated based on a target braking force of the entire vehicle determined by the pedal effort Fp and a braking force front-rear wheel distribution ratio, and the target braking forces Fbfl and Fbfr of the left and right front wheels are set to a half of the target braking force of the front two wheels, and the target braking force Fbr of the rear wheels is set to the target braking force of the rear wheel.

In step 270, the target braking force Fbfl of the left front wheel is corrected to a sum of Fbfl and the correction amount ΔFfl calculated in step 170 of the flowchart shown in FIG. 5. Similarly, the target braking force Fbfr of the right front wheel is corrected to a sum of Fbfr and the correction amount ΔFfr calculated in step 170 of the flowchart shown in FIG. 5.

In step 280, the braking device 54 is controlled such that braking forces of the left and right front wheels 12L and 12R become the corrected target braking forces Fdfl and Fdfr, respectively, and rear wheel braking force of the rear wheel becomes the target braking force Fbr.

In step 290, as in step 220, it is determined whether or not the vehicle 10 is being driven based on, for example, an accelerator opening Ap. When a negative determination is made, the control of the braking/driving forces proceeds to step 320, and when an affirmative determination is made, the control of the braking/driving forces proceeds to step 300. In step 290, it may be determined whether or not the vehicle 10 is braked based on, for example, a pedal effort Fp. When a negative determination is made, the control of the braking/driving forces may proceed to step 300, and when an affirmative determination is made, the control of the braking/driving forces may proceed to step 320.

In step 300, as in step 230 described above, target driving forces Fdfl and Fdfr of the left and right front wheels 12L and 12R are calculated based on an accelerator opening Ap. In step 310, the in-wheel motors 17L and 17R are controlled so that the driving forces of the left and right front wheels 12L and 12R become the target driving forces Fdfl and Fdfr, respectively.

In step 320, as in step 260 described above, target braking forces Fbdfl, Fbfr and Fbr are calculated based on a pedal effort Fp. In step 330, the braking device 54 is controlled such that braking forces of the left and right front wheels 12L and 12R become the target braking forces Fdfl and Fdfr, respectively, and braking force of the rear wheel becomes the target braking force Fbr.

<Steered Angle Control Routine of Rear Wheel>

Next, the steered angle control routine of the rear wheel in the embodiment will be described with reference to the flowchart shown in FIG. 7.

First, in step 410, with a wheel base of the vehicle 10 as L, a target steered angle δrt of the rear wheel 14 is calculated according to the following equation (6) based on the target lateral acceleration Gyt of the vehicle 10 and a vehicle speed V.

$$\delta rt = \tan^{-1}(L \cdot Gyt / V2) \qquad (6)$$

As shown in FIG. 13, the wheel base L of the vehicle 10 is a distance between the midpoint Pf of the ground contact points Pfl and Pfr of the left and right front wheels 12L and 12R and the ground contact point Pr of the rear wheel 14. The steered angle δr of the rear wheel 14 is an angle formed by a rotation center plane of the rear wheel 14 at the position of the rotation axis with respect to a straight line 62 connecting the midpoint Pf of the vehicle and the ground contact point Pr of the rear wheel 14. The target steered angle δrt is a target value of the steered angle δr. In FIG. 13, for the purpose of clarity, each wheel is illustrated in a non-tilted state.

In step 420, the target steered angle δrt is corrected by adding the correction amount Δδr calculated in step 160 or 190 of the flowchart shown in FIG. 5 to the target steered angle δrt of the rear wheel 14.

In step 430, it is determined whether or not the absolute value of the target steered angle δrt of the rear wheel 14 exceeds a limit value δmax (a positive constant), that is, whether or not the magnitude of the steered angle δr of the rear wheel 14 should be limited. When a negative determination is made, the control of the steered angle proceeds to step 450, and when an affirmative determination is made, the control of the steered angle proceeds to step 440.

In step 440, the target steered angle δrt of the rear wheel 14 is calculated according to the following equation (7). In the following equation (7), sign δrt means the sign of the target steered angle δrt, with the left turning direction of the vehicle 10 being positive.

$$\delta rt = \delta r\, \text{max} \cdot \text{sign}\, \delta rt \tag{7}$$

In step 450, the steering device 14A of the rear wheel 14 is controlled such that the steered angle δr of the rear wheel 14 becomes the target steered angle δrt.

As described above, vertical forces Fvfl and Fvfr acting on the front wheels caused by the braking/driving forces Fwfl and Fwfr of the front wheels 12L and 12R are expressed by the above equations (1) and (2), respectively. Therefore, an extra roll moment Mrvf acting on the vehicle body 22 via the vehicle tilting device 18 caused by the vertical forces Fvfl and Fvfr is expressed by the following equation (8). In the following equation (8), Twf is a tread of the front wheel, and the roll moment Mrvf is positive when it is a value in the direction in which the tilt angle θ of the vehicle 10 is changed to the left.

$$Mrvf = (Fvfr - Fvfl)Twf/2 = (Fwf\cdot\tan\theta fl - Fwfr\cdot\tan\theta fr)\, Twf/2 \tag{8}$$

As will be understood from FIG. 11, since the angles θfl and θfr are determined by the tilt angle θ of the vehicle 10, a magnitude relationship between these tangents, i.e., tan θfl and tan θfr is also determined by the tilt angle θ. Therefore, the magnitude of the extra roll moment Mrvf can be reduced by correcting the braking/driving forces Fwfl and Fwfr of the front wheels 12L and 12R so that a difference between the vertical forces Fvfl and Fvfr becomes smaller based on the tilt angle θ.

When the braking/driving forces Fwfl and Fwfr are corrected so that the braking/driving forces of the left and right front wheels are not the same, an extra yaw moment Myf is exerted on the vehicle 10 due to the difference between the braking/driving forces. Therefore, the magnitude of the extra yaw moment Myf acting on the vehicle 10 can be reduced by correcting the target steered angle δrt of the rear wheel 14 so that a yaw moment countering at least a part of the extra yaw moment is generated.

Next, the correction of the braking/driving forces of the left and right front wheels 12L and 12R and the correction of the steered angle δr of the rear wheel 14 will be described with respect to various traveling conditions of the automatic tilting vehicle 10.

<When Moving Forward in a Left Turn>

When the vehicle 10 is moving forward in a left turn, the tilt angle θ assumes a positive value, and tan θfr becomes larger than tan θfl. Therefore, in order to reduce the magnitude of the roll moment Mrvf, the magnitude of the braking/driving force Fwfl of the left front wheel 12L which is the turning inner wheel is to be increased, and the magnitude of the braking/driving force Fwfr of the right front wheel 12R which is the turning outer wheel is to be reduced.

(When Driving)

When the vehicle 10 is driving in a left turn, negative determinations are made in steps 100 and 110 of the flowchart shown in FIG. 5, and an affirmative determination is made in step 130. In step 140, by referring to the map shown in the right half of FIG. 8 based on the tilt angle θ of the vehicle 10, a correction amount ΔFfl of the braking/driving force Fwfl of the left front wheel is calculated as a positive value. A correction amount ΔFfr of the braking/driving force Fwfr of the front wheels is calculated as a negative value.

Affirmative determinations are made in steps 210 and 220 of the flowchart shown in FIG. 6, and in step 230, target driving forces Fdfl and Fdfr of the left and right front wheels 12L and 12R are calculated. In step 240, the magnitude of the target driving force Fdfl for the left front wheel is corrected to be increased, and the magnitude of the target driving force Fdfr for the right front wheel is corrected to be reduced. Therefore, the magnitude of the roll moment Mrvf can be reduced.

Furthermore, in step 150, an index value ΔFfl is calculated to be a positive value, and in step 160, by referring to the map shown in the right half of FIG. 10 based on an index value ΔFf of the steered angle correction, a correction amount Δδr of the target steered angle δrt of the rear wheel 14 is calculated to be a positive value. Then, in step 420 of the flowchart shown in FIG. 7, the target steered angle δrt (a positive value) is corrected to be increased.

Therefore, at least a part of an extra yaw moment in the right turning direction that is caused by the magnitude of the target driving force Fdfl of the left front wheel being corrected to be increased and the magnitude of the target driving force Fdfr of the right front wheel being corrected to be reduced is offset by a yaw moment generated by the increase of the steered angle δr of the rear wheel 14. Therefore, it is possible to reduce a change in the yaw rate of the vehicle caused by the correction of the target driving forces Fdfl and Fdfr of the left and right front wheels 12L and 12R.

(When being Braked)

When the vehicle 10 is being braked in a left turn, negative determinations are made in steps 100, 110 and 130 of the flowchart shown in FIG. 5, respectively. In step 170, by referring to the map shown in the right half of FIG. 9 based on the tilt angle θ of the vehicle 10, a correction amount ΔFfl of the braking/driving force Fwfl of the left front wheel is calculated to be a negative value and a correction amount ΔFfr of the braking/driving force Fwfr of the right front wheel is calculated to be a positive value.

An affirmative determination is made in step 210 of the flowchart shown in FIG. 6, and a negative determination is made in step 220. In step 260, the target braking forces Fbfl and Fbfr for the left and right front wheels and a target braking force Fbr for the rear wheel are calculated (they are negative values), and in step 270, the magnitude of the target braking force Fbfl for the left front wheel is corrected to be increased and the magnitude of the target braking force Fbfr of the right front wheel is corrected to be reduced. Therefore, the magnitude of the roll moment Mrvf can be reduced.

Furthermore, in step 180, the index value ΔFfl is calculated to a negative value, and in step 190, by referring to the map shown in the left half of FIG. 10 based on the tilt angle θ of the vehicle 10, the correction amount Δδr of the target steered angle δrt is calculated to a negative value. Then, in step 420 of the flowchart shown in FIG. 7, the target steered angle δrt (a positive value) is corrected to be reduced.

Accordingly, at least a part of an extra yaw moment in the left turning direction that caused by the magnitude of the target braking force Fbfl of the left front wheel being corrected to be increased and the magnitude of the target braking force Fbfr of the right front wheel being corrected to be reduced is offset by a yaw moment generated by the reduction of the steered angle δr of the rear wheel 14. Therefore, it is possible to reduce a change in the yaw rate of the vehicle caused by the correction of the target braking forces Fbfl and Fbfr of the left and right front wheels 12L and 12R.

<When Moving Forward in a Right Turn>

When the vehicle 10 is moving forward in a right turn, the tilt angle θ assumes a negative value, and tan θfl becomes larger than tan θfr. Therefore, in order to reduce the magnitude of the roll moment Mrvf, the magnitude of the braking/driving force Fwfl of the left front wheel 12L which is the turning outer wheel is to be reduced, and the magnitude of the braking/driving force Fwfr of the right front wheel 12R which is the turning inner wheel is to be increased.

When the vehicle is moving forward in a right turn, the target braking driving force is corrected in the same manner as when turning left except that the direction of the roll moment Mrvf, the increase/decrease in the target braking/driving force of the left and right front wheels 12L and 12R, etc. become opposite to those when the vehicle is moving forward in a left turn. Therefore, the magnitude of the roll moment Mrvf can be reduced.

Furthermore, when the vehicle is moving forward in a right turn, the target turning angle δrt is corrected in the same manner as when turning left, except that the direction of the extra yaw moment due to the increase/decrease correction of the target braking/driving forces, the increase/decrease when correcting the target turning angle δrt, etc. become opposite to those when the vehicle is moving forward in a left turn. Therefore, it is possible to reduce the change in the yaw rate of the vehicle caused by the correction of the target braking/driving forces.

<When Travelling Straight Ahead>

The tilt angle θ and the target tilt angle θt of the vehicle 10 which are calculated in steps 10 and 30, respectively, of the flowchart shown in FIG. 4 are zero. Therefore, in step 140 or 170 of the flowchart shown in FIG. 5, the correction amounts ΔFfl and ΔFfr of the braking/driving forces Fwfl and Fwfr of the left and right front wheels are both calculated to be zero, so that the target driving forces Fdfl and Fdfr and the target braking forces Fbfl and Fbfr are not corrected.

Furthermore, since the correction amounts ΔFfl and ΔFfr are zero, the index value ΔFf calculated in step 150 or 180 of the flowchart shown in FIG. 5 is also zero. Therefore, the correction amount Δδr of the target steered angle δrt of the rear wheel 14 calculated in step 160 or 190 also becomes zero, so that the correction of the target turning angle δrt is not performed.

<When in Inertial Travel and Reverse Travel>

When the vehicle is in inertial travel, an affirmative determination is made in step 100 of the flowchart shown in FIG. 5. When the vehicle is in reverse travel, in step 100, a negative determination is made and in step 110, an affirmative determination is made. Therefore, in step 120, the correction amounts ΔFfl and ΔFfr of the target braking/driving forces of the left and right front wheels and the correction amount Δδr of the target steered angle δrt of the rear wheels are set to zero, so that the target driving forces Fdfl and Fdfr are not corrected and the target steered angle δrt of the rear wheel is not corrected.

As understood from the above description, according to the embodiment, when the vehicle turns while traveling, the braking/driving force of a turning outer front wheel is reduced and the braking/driving force of a turn inner front wheel is increased when the turning direction is either left or right and during driving or braking. Therefore, a difference between the vertical forces Fvfl and Fvfr generated on the left and right front wheels by the braking/driving forces of the left and right front wheels is reduced, so that the magnitude of the extra roll moment Mrvf acting on the vehicle body 22 via the vehicle tilting device 18 due to the difference between the vertical forces Fvfl and Fvfr can be reduced. Accordingly, an influence of the extra roll moment Mrvf can be reduced and the vehicle tilt angle θ can be accurately controlled to the target tilt angle θt.

In particular, according to the embodiment, as shown in FIG. 8 and FIG. 9, the signs of the correction amounts ΔFfl and ΔFfr of the braking/driving forces Fwfl and Fwfr of the left and right front wheels are opposite to each other, and the magnitudes thereof are the same regardless of the tilt angle θ. Therefore, one of the target braking/driving forces of the left and right front wheels is corrected to be increased, and the other is corrected to be reduced, but the target braking and driving force of the entire vehicle does not increase or decrease. Therefore, it is possible to avoid unnatural acceleration/deceleration of the vehicle due to increase/decrease correction of the target braking/driving forces of the left and right front wheels.

Furthermore, the target steered angle δrt of the rear wheel 14 is corrected such that at least a part of the unnecessary yaw moment resulting from the increase/decrease corrections of the target braking/driving forces of the left and right front wheels is offset. Therefore, it is possible to reduce the possibility that the yaw rate of the vehicle unnaturally changes due to the unnecessary yaw moment. In addition, an amount of correction steering that the driver must perform to cancel unnecessary yaw moment can be reduced, so that the driver's steering load can be reduced.

In particular, according to the embodiment, as shown in FIG. 10, a magnitude of the correction amount Δδr of the target steered angle δrt is variably set according to the vehicle speed V so as to decrease as a vehicle speed V increases. Therefore, in a low to middle vehicle speed region, the steered angle δr of the rear wheel 14 can be corrected to increase the magnitude of the correction amount Δδr to effectively offset the extra yaw moment caused by the increase/decrease corrections of the braking/driving forces of the left and right front wheels. On the contrary, in a high speed region, the magnitude of the correction amount Δδr can be reduced, and the possibility that the correction of the steered angle δr of the rear wheel 14 becomes excessive can be effectively reduced.

Although the present disclosure has been described in detail with reference to a specific embodiment, it will be apparent to those skilled in the art that the present disclosure is not limited to the above-described embodiment, and various other embodiments are possible within the scope of the present disclosure.

For example, in the above-described embodiment, the magnitudes of the correction amounts ΔFfl and ΔFfr of the braking/driving forces Fwfl and Fwfr of the left and right front wheels are identical to each other regardless of the tilt angle θ of the vehicle 10, as shown in FIGS. 8 and 9. However, the magnitudes of the correction amounts ΔFfl and ΔFfr may be different from each other.

Further, in the above-described embodiment, the correction amounts ΔFfl and ΔFfr are calculated by referring to the map shown in FIG. 8 or FIG. 9 based on the tilt angle θ of the vehicle 10. However, the map for calculating the correction amounts ΔFfl and ΔFfr may be a map with the difference between the angles θfl and θfr or the difference between the tan θfl and tan θfr of the angles θfl and θfr as variables, and further may be a map using a target tilt angle θt of the vehicle 10 as a variable.

Further, in the above-described embodiment, the instantaneous centers Ofl and Ofr of the front wheels 12L and 12R are located behind and above the ground contact points Pfl and Pfr, respectively, with respect to the vehicle but may not be located behind and above the ground contact points. For example, the instantaneous centers Ofl and Ofr may be located in front of and above the ground contact points Pfl and Pfr, respectively. In that case, since the vertical forces generated by the braking/driving forces of the front wheels act in the direction opposite to the vertical forces in the embodiment, the direction of the roll moment Mrvf is opposite to that in the embodiment but increase/decrease corrections of the braking/driving forces Fwfl and Fwfr of the front wheels may be the same as in the embodiment.

Further, in the above-described embodiment, while the braking/driving forces Fwfl and Fwfr of the left and right front wheels are not corrected when the vehicle 10 travels backward, the braking/driving forces Fwfl and Fwfr of the left and right front wheels may be corrected when the vehicle 10 travels backward. However, in that case, increase and decrease of the correction of the target steered angle δrt of the rear wheel 14 is opposite to those when the vehicle is moving forward.

Further, in the above-described embodiment, the target steered angle δrt of the rear wheel 14 is corrected such that at least a part of the unnecessary yaw moment resulting from the increase/decrease corrections of the target braking/driving forces of the left and right front wheels is offset. However, the correction of the target steered angle δrt of the rear wheel 14 may be omitted.

Figure 17:
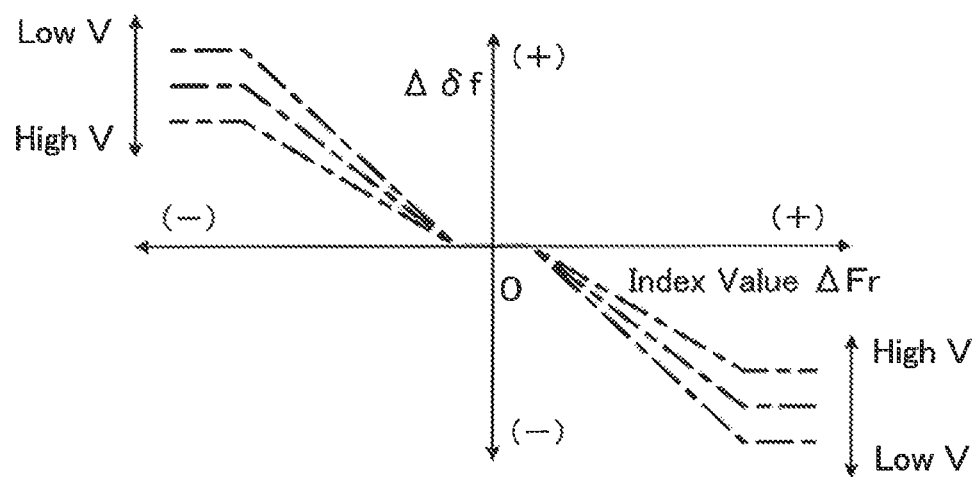
FIG. 17 is a map for calculating a steered angle correction amount Δδf of the front wheels based on the index value ΔFr of the steered angle correction in a modification in which the left and right front wheels in the embodiment are left and right rear wheels and a front wheel is a turning wheel.

Further, in the above-described embodiment, although there is one rear wheel, two rear wheels having smaller treads than the left and right front wheels may be provided. Furthermore, a steered wheel may be located further forward than the pair of wheels 12L, 12R such that the front wheels 12L, 12R in the embodiment are rear wheels. In that case, the correction direction of the steered angle of the steered wheel for preventing unnecessary yaw moment acting on the vehicle due to a difference of braking/driving forces of the pair of wheels is opposite to the correction direction in the embodiment. For example, as shown in FIG. 17 corresponding to FIG. 10, a steered angle correction amount Δδf of the front wheel is calculated based on an index value ΔFr of steered angle correction of the front wheel calculated based on the correction amounts of the braking driving forces of the left and right rear wheels.

What is claimed is:

1. An automatic tilting vehicle that includes a pair of wheels that are non-steering driving wheels laterally spaced, a braking/driving device for applying braking/driving forces to the pair of wheels, a vehicle tilting device that is configured to tilt the vehicle by displacing the pair of wheels in the vertical direction opposite to each other with respect to a vehicle body, and a control unit for controlling the braking/driving device and the vehicle tilting device, wherein the control unit is configured to decreasingly correct a target braking/driving force of a turning outer wheel of the pair of wheels and increasingly correct a target braking/driving force of a turning inner wheel of the pair of wheels so that a difference in vertical forces acting on the pair of wheels due to the braking/driving forces of the pair of wheels is reduced, and to calculate a reduction correction amount of the target braking/driving force of the turning outer wheel and an increase correction amount of the target braking/driving force of the turning inner wheel based on the tilt angle of the vehicle so that magnitudes of the target braking/driving force correction amounts increase as a tilt angle of the vehicle increases.

2. The automatic tilting vehicle according to claim 1, wherein the magnitude of the reduction correction amount of the target braking/driving force of the turning outer wheel and the magnitude of the increase correction amount of the target braking/driving force of the turning inner wheel are the same.

3. The automatic tilting vehicle according to claim 1, wherein the vehicle has at least one steering wheel spaced in the front-rear direction with respect to the pair of wheels, and the control unit is configured to calculate a target steered angle of the steered wheel based on a steering operation of a driver, correct the target steered angle so as to cancel at least a part of a yaw moment caused by the correction of the braking/driving forces of the pair of wheels, and control a steered angle of the steered wheels based on the corrected target steered angle.

4. The automatic tilting vehicle according to claim 3, wherein a magnitude of the correction amount of the target steered angle is variably set according to a vehicle speed so as to decrease as the vehicle speed increases.

* * * * *